(12) United States Patent
Quinton

(10) Patent No.: US 7,356,409 B2
(45) Date of Patent: Apr. 8, 2008

(54) MANIPULATING A TELEPHONY MEDIA STREAM

(75) Inventor: Mary Michelle Quinton, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 266 days.

(21) Appl. No.: 11/055,033

(22) Filed: Feb. 9, 2005

(65) Prior Publication Data

US 2005/0246468 A1    Nov. 3, 2005

Related U.S. Application Data

(63) Continuation of application No. 09/649,510, filed on Aug. 25, 2000, now Pat. No. 6,904,485, which is a continuation-in-part of application No. 09/157,469, filed on Sep. 21, 1998, now Pat. No. 6,343,116.

(51) Int. Cl.
    *G06F 13/00*    (2006.01)
(52) U.S. Cl. .............................. 701/301; 710/63; 710/8
(58) Field of Classification Search ........ 710/300–309, 710/313–315, 8–14, 63–64; 709/326–329, 709/313–317
See application file for complete search history.

(56) References Cited

U.S. PATENT DOCUMENTS

| | | | | |
|---|---|---|---|---|
| 4,860,342 A | * | 8/1989 | Danner | .................... 379/93.28 |
| 5,473,680 A | | 12/1995 | Porter | |
| 5,572,675 A | * | 11/1996 | Bergler | ........................ 719/328 |
| 5,574,888 A | * | 11/1996 | Panditji et al. | ................ 703/26 |

(Continued)

FOREIGN PATENT DOCUMENTS

JP    6062142 A    3/1994

(Continued)

OTHER PUBLICATIONS

U.S. Appl. No. 09/557,333, filed Apr. 24, 2000, Quinton.

(Continued)

*Primary Examiner*—Raymond N Phan
(74) *Attorney, Agent, or Firm*—Perkins Coie LLP

(57) ABSTRACT

Systems, methods, and data structures for pluggable terminals are provided. Pluggable terminals are part of client and server TAPI communications systems. Pluggable terminal allow third parties to provide their own media processing devices and implement control methods for those devices. Methods for plugging in a pluggable terminal and conducting a communications session using the new pluggable terminal are described. A data structure for a pluggable terminal type has a wrapper around a media processing device control method. A data structure for registering a pluggable terminal has a terminal class name, a unique identifier, and a set of media types supported by the pluggable terminal. A data structure for a terminal base class has an interface for plugging in a pluggable terminal and another interface for a TAPI application component.

20 Claims, 15 Drawing Sheets

U.S. PATENT DOCUMENTS

| | | | |
|---|---|---|---|
| 5,633,916 | A | 5/1997 | Goldhagen et al. |
| 5,717,742 | A | 2/1998 | Hyde-Thomson et al. |
| 5,764,639 | A * | 6/1998 | Staples et al. .............. 370/401 |
| 5,799,067 | A | 8/1998 | Kikinis et al. |
| 5,852,719 | A | 12/1998 | Fishler et al. |
| 5,915,001 | A | 6/1999 | Uppaluru |
| 5,943,399 | A | 8/1999 | Bannister et al. |
| 5,999,207 | A | 12/1999 | Rodriguez et al. |
| 6,006,253 | A * | 12/1999 | Kumar et al. ................ 709/204 |
| 6,018,571 | A * | 1/2000 | Langlois et al. ........ 379/201.04 |
| 6,044,347 | A | 3/2000 | Abella et al. |
| 6,094,635 | A | 7/2000 | Scholz et al. |
| 6,097,380 | A * | 8/2000 | Crites et al. ............. 715/500.1 |
| 6,173,266 | B1 | 1/2001 | Marx et al. |
| 6,208,724 | B1 | 3/2001 | Fritzinger et al. |
| 6,256,680 | B1 * | 7/2001 | Kim .......................... 719/328 |
| 6,269,254 | B1 | 7/2001 | Mathis |
| 6,269,336 | B1 | 7/2001 | Ladd et al. |
| 6,282,269 | B1 | 8/2001 | Bowater et al. |
| 6,314,402 | B1 | 11/2001 | Monaco et al. |
| 6,337,858 | B1 | 1/2002 | Petty et al. |
| 6,343,116 | B1 | 1/2002 | Quinton et al. |
| 6,445,694 | B1 | 9/2002 | Swartz |
| 6,463,051 | B1 | 10/2002 | Ford |
| 6,515,695 | B1 | 2/2003 | Sato et al. |
| 6,529,863 | B1 | 3/2003 | Ball et al. |
| 6,606,611 | B1 | 8/2003 | Khan |
| 6,618,476 | B1 | 9/2003 | Szeto et al. |
| 6,621,901 | B1 | 9/2003 | Gruia et al. |
| 6,625,258 | B1 | 9/2003 | Ram et al. |
| 6,681,001 | B1 | 1/2004 | Clayton et al. |
| 6,687,342 | B1 | 2/2004 | Hettish |
| 6,704,394 | B1 | 3/2004 | Kambhatla et al. |
| 6,741,688 | B1 | 5/2004 | Yau |
| 6,754,313 | B1 | 6/2004 | Quinton et al. |
| 6,757,374 | B2 | 6/2004 | Bardehle |
| 6,778,661 | B1 | 8/2004 | Yumoto et al. |
| 6,804,339 | B1 | 10/2004 | Hettish |
| 6,829,334 | B1 | 12/2004 | Zirngibl et al. |
| 6,859,776 | B1 | 2/2005 | Cohen et al. |
| 6,888,927 | B1 | 5/2005 | Cruickshank et al. |
| 6,904,485 | B1 | 6/2005 | Quinton |
| 6,999,932 | B1 | 2/2006 | Zhou |
| 2002/0006124 | A1 | 1/2002 | Jimenez et al. |
| 2002/0032806 | A1 | 3/2002 | Machin et al. |
| 2002/0183044 | A1 | 12/2002 | Blackwell et al. |
| 2004/0234051 | A1 | 11/2004 | Quinton |
| 2004/0240629 | A1 | 12/2004 | Quinton |
| 2004/0240630 | A1 | 12/2004 | Quinton |
| 2004/0240636 | A1 | 12/2004 | Quinton |
| 2005/0105697 | A1 | 5/2005 | Hollowell et al. |
| 2005/0193332 | A1 | 9/2005 | Dodrill et al. |

FOREIGN PATENT DOCUMENTS

| | | |
|---|---|---|
| JP | 6062142 A2 | 3/1994 |

OTHER PUBLICATIONS

"CT Media API Reference—vol. 2 for Windows NT" (261 pages), unknown date.

"CT Media API Reference—vol. 1 for Windows NT" (557 pages), unknown date.

"CT Media—A Breakthrough in Client/Server Computer Telephony," Dialogic, Apr. 1999 (40 pages).

"Java Telephony API (JTAPI)," J2ME, A Sun Developer Network Site, Copyright 1994-2005 Sun Microsystems, Inc. (4 pages) http://java.sun.com/products/jtapi [last accessed Oct. 21, 2005].

"Java Telephony API Call Center Extension Package", Revision 1.2, Oct. 1997, API Specifications, A Sun Developer Network Site (11 pages) http://java.sun.com/products/jtapi/jtapi-1.2/CallCentOverview.html, 11 pages, [last accessed Oct. 21, 2005].

"Java Telephony API Call Control Extension Package," Oct. 1997, Version 1.2, API Specifications, A Sun Developer Network Site (11 pages) http://java.sun.com/products/jtapi/jtapi-1.2/CallCtlOverview.html, [last accessed Oct. 20, 2005].

"An Introduction to JTAPI (Java Telephony API) Release 1.2 Rev. 0.7," White Papers, A Sun Developer Network Site, Copyright Sun Microsystems, Inc. (14 pages) http://java.sun.com/products/jtapi/jtapi-1.2/JTAPIWhitePaper_0_7.html [last accessed Oct. 20, 2005].

"Java Telephony API Media Extension Package," Jan. 28, 1997, Version 1.0, API Specifications, A Sun Developer Network Site, http://java.sun.com/products/jtapi/jtapi-1.2/MediaOverview.html, 8 pages, [last accessed Oct. 20, 2005].

"The Java Telephony API, An Overview," Oct. 1997, Version 1.2, Documentation, A Sun Developer Network Site (14 pages) http://java.sun.com/products/jtapi/jtapi-1.2/Overview.html [last accessed Oct. 21, 2005].

"Java Telephony API Phone Extension Package," Jan. 28, 1997, Version 1.1, API Specifications, A Sun Developer Network Site (4 pages) http://java.sun.com/products/jtapi/jtapi-1.2/PhoneOverview.html [last accessed Oct. 20, 2005].

"Introduction to DirectShow," Microsoft DirectShow 9.0, Microsoft Corporation, Copyright Microsoft Corporation (8 pages) http://msdn.microsoft.com/library/en-us/directshow/htm/introductiontodirectshow.asp?frame=true [last accessed Oct. 21, 2005], unknown date.

"Java Telephony API," JTAPI, 16 pages, unknown date.

* cited by examiner

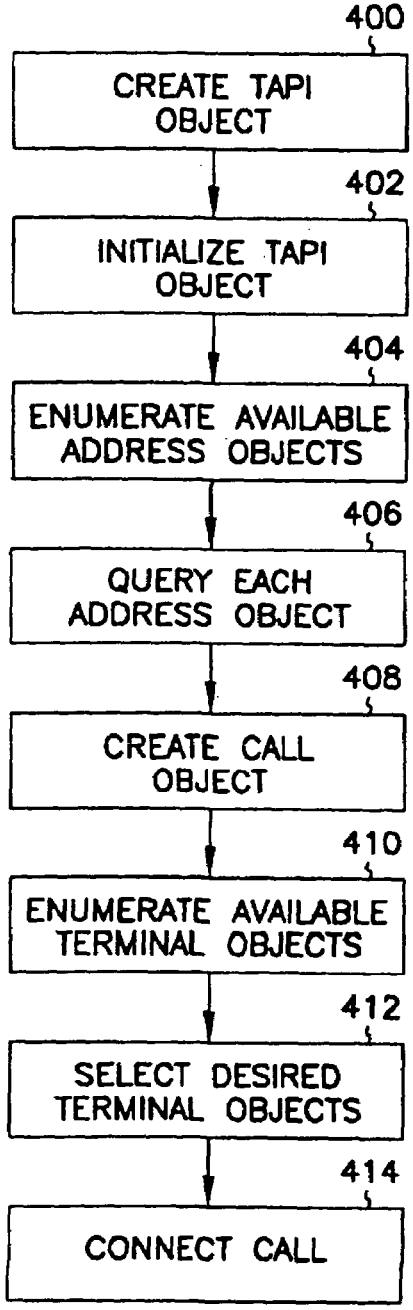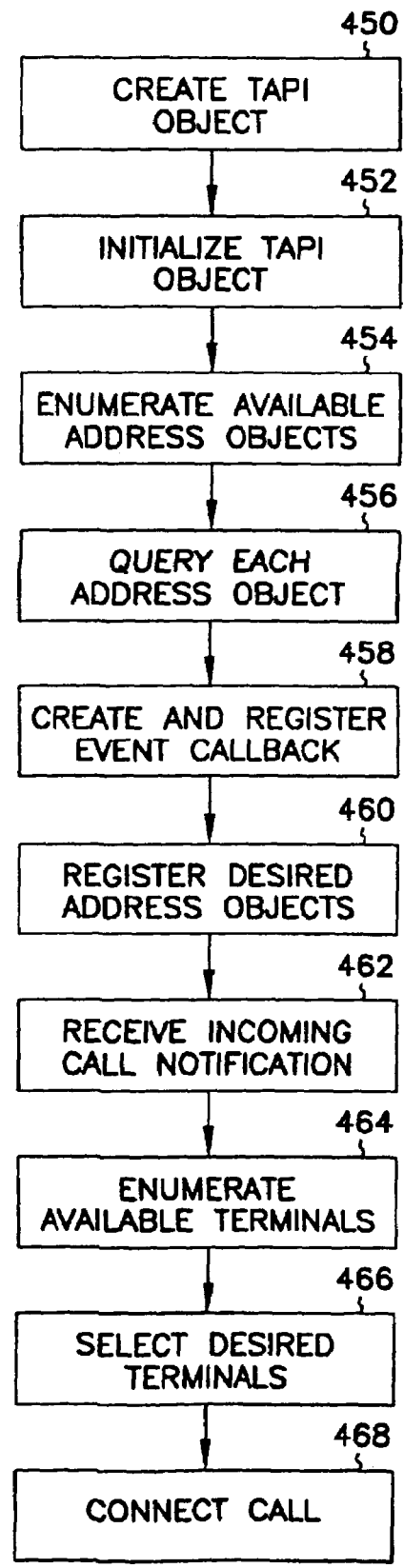
FIG. 4(a)
FIG. 4(b)

1600

DATA STRUCTURE FOR REGISTERING A PLUGGABLE TERMINAL

| |
|---|
| TERMINAL CLASS NAME — 1602 |
| UNIQUE IDENTIFIER — 1604 |
| SET MEDIA FLOW DIRECTIONS = {FLOWING TO THE PLUGGABLE TERMINAL, FLOWING FROM THE PLUGGABLE TERMINAL} — 1606 |
| SET MEDIA TYPES = {AUDIO, VIDEO, TEXT, GRAPHICS, MODEM TRANSMISSIONS, FACSIMILE TRANSMISSIONS, TELEPHONY TRANSMISSIONS, VIDEOCONFERENCING TRANSMISSIONS, CO-BROWSING TRANSMISSIONS, APPLICATION SHARING TRANSMISSIONS, DOCUMENT SHARING TRANSMISSIONS, COLLABORATIVE COMPUTING TRANSMISSIONS, CHAT TRANSMISSIONS VISUAL CHAT TRANSMISSIONS, INTERNET PROTOCOL (IP) TELEPHONY TRANSMISSIONS, INSTANT MESSAGING TRANSMISSIONS, PUBLIC SWITCHED TELEPHONE NETWORK (PSTN) CALLS, TONE TRANSMISSIONS, SPEECH TRANSMISSIONS, IP INTERACTIVE VOICE RESPONSE SYSTEM TRANSMISSIONS, IP UNIFIED MESSAGE SYSTEM TRANSMISSIONS, CALLER IDENTIFICATION TRANSMISSIONS, MUSIC, MOVIES, STILL PICTURES, PHOTOGRAPHS, RADIO TRANSMISSIONS, TELEVISION TRANSMISSIONS, CABLE TRANSMISSIONS, PORTABLE DEVICE TRANSMISSIONS, WEARABLE COMPUTER TRANSMISSIONS, TABLET TRANSMISSIONS, HANDHELD DEVICE TRANSMISSIONS, POCKET-SIZED PERSONAL COMPUTER TRANSMISSIONS, DIGITAL PHONE CALLS, CELLULAR PHONE CALLS} — 1608 |
| NAME — 1610 |
| COMPANY NAME — 1612 |
| VERSION — 1614 |
| METHOD FOR REGISTERING ITSELF — 1616 |
| METHOD FOR FIRING EVENTS TO A TERMINAL MANAGER COMPONENT — 1618 |

FIG. 16

MANIPULATING A TELEPHONY MEDIA STREAM

CROSS-REFERENCE TO RELATED APPLICATION(S)

This application is a continuation of U.S. patent application Ser. No. 09/649,510, filed Aug. 25, 2000 now U.S. Pat. No. 6,904,485 entitled "PLUGGABLE TERMINAL ARCHITECTURE FOR TAPI," which application is a continuation-in-part of U.S. Ser. No. 09/157,469, filed Sep. 21, 1998, now U.S. Pat. No. 6,343,116 entitled "Computer Telephony Application Programming Interface". These applications are hereby incorporated by reference herein in their entireties.

TECHNICAL FIELD

This invention relates generally to computer telephony, and more particularly to an application programming interface for computer telephony.

COPYRIGHT NOTICE—PERMISSION

A portion of the disclosure of this patent document contains material, which is subject to copyright protection. The copyright owner has no objection to the facsimile reproduction by anyone of the patent document or the patent disclosure as it appears in the Patent and Trademark Office patent files or records, but otherwise reserves all copyright rights whatsoever. The following notice applies to the software and data as described below and in the drawings attached hereto: Copyright © 1999, 2000, Microsoft Corporation, All Rights Reserved.

BACKGROUND

With the advent of computer networking, such as local-area networks (LAN), wide-area networks (WAN), intranets and the Internet, several applications have become popularized. In one such application, a user of a first client computer is able to "call" and communicate with a user of a second client computer. This type of application is generally known as computer telephony.

To accommodate computer telephony, operating systems such as versions of the MICROSOFT WINDOWS operating systems include telephony application programming interfaces, or TAPI's. (It is noted that TAPI typically refers specifically to Microsoft's Telephony API and is not usually used in reference to other telephony API's. However, as used in this application, TAPI refers to telephony API's generically.) Application programming interfaces (API's) are interfaces by which computer programs can provide for specific functionality that is included within the operating systems. This means that programmers developing such programs do not have to develop their own code to provide this functionality, but rather can rely on the code within the operating system itself. Thus, a TAPI relates to a computer telephony application programming interface.

In the MICROSOFT WINDOWS 95 operating system, as well as other versions of the MICROSOFT WINDOWS operating system, TAPI version 2.1 provides for some basic computer telephony functionality for utilization by computer programs. In particular, TAPI 2.1 provides for call control—the initiation and termination of computer telephony calls. However, call control is only one aspect of computer telephony. For example, once a computer telephony call is placed, the media aspects of the call must also be controlled. However, TAPI 2.1, as well as other prior art telephony API's, do not provide for this functionality.

The media aspects of the call relate to the information (or, media) that is itself the subject of the call. For example, a voice call includes audio information transmitted by both the caller and callee of a call, a video call includes both audio information and visual (video) information, etc. Currently, any multimedia devices that are to be used in conjunction with a computer telephony call—such as microphones to detect sound, and speakers to play sound—must have specific drivers written for this purpose, to be used specifically in conjunction with computer telephony calls. Other multimedia devices that may be present, in other words, may not be usable in conjunction with the call.

TAPI 2.1, as well as other prior art telephony API's, are also represented as a framework that is not easily expanded. For example, TAPI 2.1 is procedurally based, which means the API cannot easily accommodate new aspects and features without redeveloping the entire API. For the reasons outlined in this background, as well as other reasons, there is, therefore, a need for the present invention.

SUMMARY

The above-identified problems, shortcomings and disadvantages with the prior art, as well as other problems, shortcoming and disadvantages, are solved by the present invention, which will be understood by reading and studying the specification and the drawings. In one embodiment, a system includes at least one call control object and at least one media control object. The call control objects are to initiate and terminate a computer telephony call having a media stream. The media control objects are to end-point the media stream of the computer telephony call. In a further embodiment, there is also a media control manager to instantiate a media control object for each multimedia device of the system.

Thus, embodiments of the invention provide for advantages not found in the prior art. The invention provides for well-defined media control: besides call control objects, embodiments of the invention include media control objects to end-point (for example, source or sink) the media stream of a computer telephony call. The invention provides for the utilization of multimedia devices (including virtual devices as well as physical devices) that may not have been installed specifically for telephony purposes, via the media control manager instantiating media control objects for such devices. Furthermore, the invention provides for an object-based hierarchy to TAPI's (e.g., via the call control objects and the media control objects), to maximize flexibility and further expansion of TAPI's based on the invention.

The invention includes systems, methods, computers, application programming interfaces, and computer-readable media of varying scope. Besides the embodiments, advantages and aspects of the invention described here, the invention also includes other embodiments, advantages and aspects, as will become apparent by reading and studying the drawings and the following description.

BRIEF DESCRIPTION OF THE DRAWINGS

FIG. 4(a) shows a method for placing an outgoing computer telephony call according to an embodiment of the invention; and, FIG. 4(b) shows a method for receiving an incoming computer telephony call according to an embodiment of the invention.

FIG. 16 is a structural diagram of a data structure according to one aspect of the present invention.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system of one embodiment of the invention is presented. In the third section, a method, in accordance with an embodiment of the invention, is provided. In the fourth section, various system, method, and data structure embodiments of one aspect of the present invention, namely pluggable terminals, are described. Finally, in the fifth section, a conclusion of the detailed description is provided.

Hardware and Operating Environment

Figure 1:
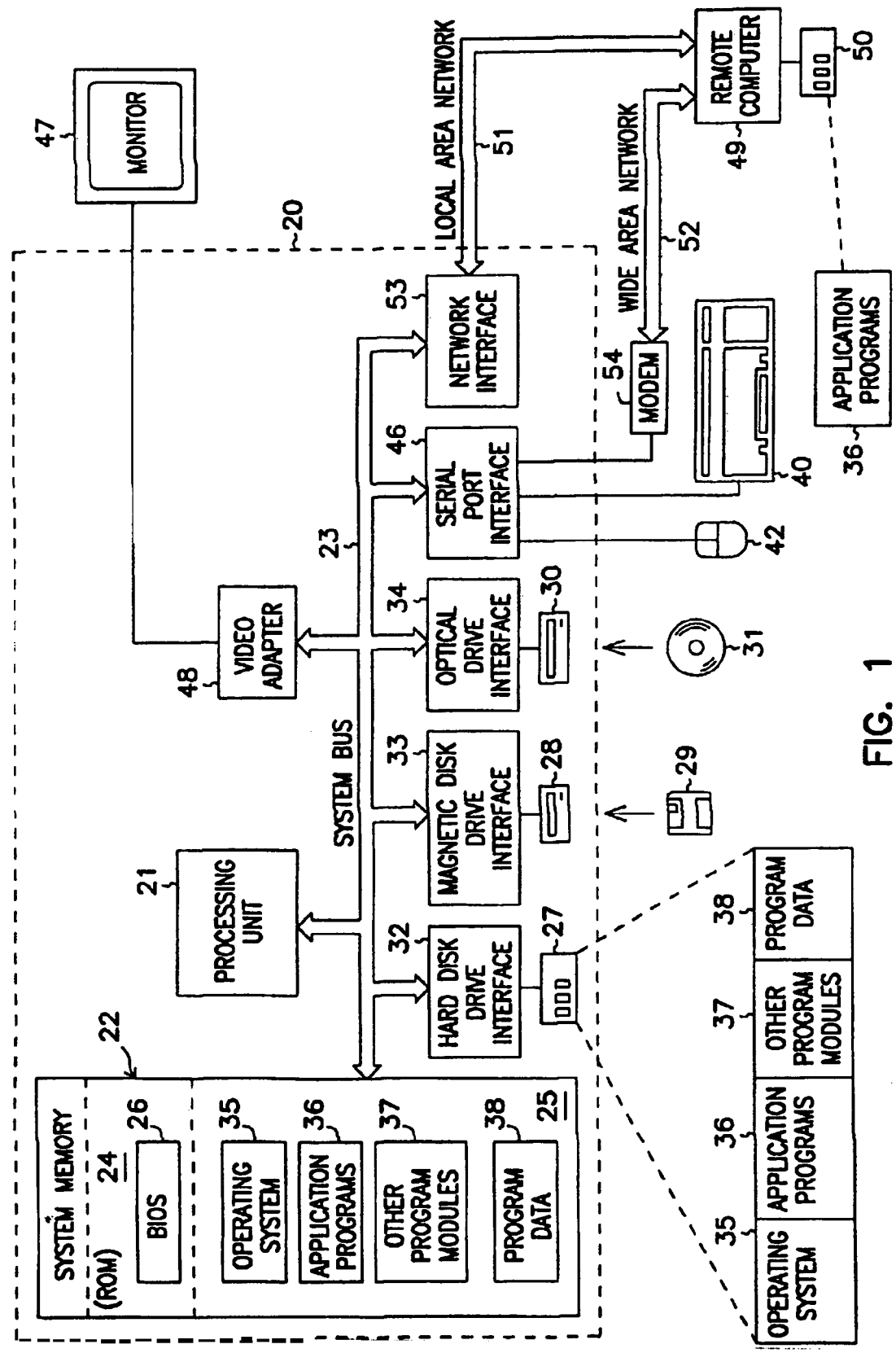
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System

Figure 2:
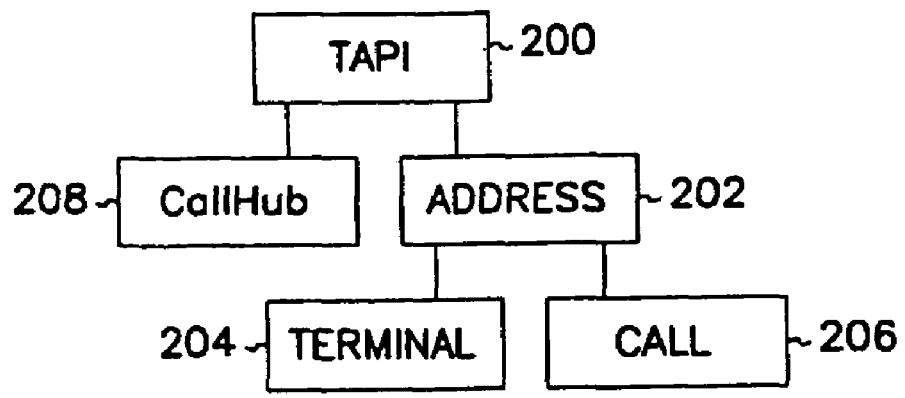
FIG. 2 shows a block diagram of an object hierarchy according to one embodiment of the invention.

In this section of the detailed description, a description of a computerized system according to an embodiment of the invention is provided. The description is provided by reference to FIG. 2 and FIG. 3. Referring first to FIG. 2, an object hierarchy according to an embodiment of the invention is shown. The system includes a telephony application programming interface object (TAPI object) 200, an address object 202, a terminal object 204, a call object 206, and a call-hub object 208. For each of objects 202, 204, 206 and 208, only a single object of each type is shown in FIG. 2 for purposes of clarity; however, there can be in one embodiment of the invention multiple instantiations of each of these objects. Each of the objects 202, 204, 206 and 208 may in one embodiment correspond to a specific means for performing functionality of the object.

The interface object 200 provides an interface by which computer programs can access the functionality provided by these other objects. This means that the computer programs themselves do not have to include code for this functionality, but instead can rely on the functionality provided by the objects themselves as already existing, and as interfaced to such programs via the interface object 200. Application programming interfaces within operating systems such as versions of the MICROSOFT WINDOWS operating system are known within the art.

The address object 202 is a type of first-party call control object. A call control object is an object that provides for the initiation and termination of a computer telephony call having a media stream—that is, the object provides for the connection and ending of a call. In particular, the address object 202 is an object over which a computer telephony call may be placed. That is, the address object 202 represents a line or device that can make or receive calls on it. In different embodiments of the invention, the object represents a modem attached to a PSTN (Public Switching Telephone Network) phone line, an ISDN (Integrated Services Digital Network) hardware card attached to an ISDN line, a DSL (Digital Subscriber Loop) modem attached to a PSTN phone line having DSL capability, and an IP (Internet Protocol) address that is able to make IP telephony calls. However, the invention is not limited to a particular representation. The address object 202 is a first-party call control object in that it relates to a party of the telephony call—for example, the caller or callee of the telephony call—as opposed to a third party not specifically of the telephony call.

The terminal object 204 is a type of media control object. A media control object is an object that end-points the media stream of a computer telephony call. The media stream of a computer telephony call is the information that actually makes up the call—for example, audio information in the case of a voice call, audio and image (video) information in the case of a video call, etc. A media control object end-points the media stream in that it can be a sink object, which is a finishing end point such as speaker or a monitor where the media stream ends or is "sunk" after it has been communicated from one party to the call to another party to the call, or a source object, which is a beginning end point such as a microphone or a speaker where the media stream begins or is "sourced" such that it is then communicated from one party to the call to another party to the call. The terminal object 204 can represent physical devices, such as the microphone or speakers on a sound card, a video camera, and a phone, as well as more dynamic, virtual devices, such as a video window on the screen, a file to which the media stream is saved, and a DTMF (Dual Tone Multiple Frequency) detector.

The call object 206 is another type of first-party call control object. In particular, the call object 206 represents an end-point of the computer telephony call. For example, for a caller to callee direct call, there would be two call objects

206, a first object representing the first end point of the call, and a second object representing the second end point of the call. In a conference call, there would be more than two call objects 206, one object 206 for each participant (end point).

The call-hub object 208 is a third-party call control object. The call-hub object 208 relates the call objects 206 for a particular computer telephony call. In other words, it represents a telephony connection itself, and is basically a collection of call objects that are all related because they are on the same telephony connection. For example, one type of call-hub object 208 is a tracking object in a call center environment, to track the callers on a particular call, the duration of the phone call, etc. A third-party call control object is also able to initiate and terminate a phone call. However, the object is a third-party call control object in that it does not specifically relate to a particular party of the telephony call, but rather may encompass all the parties of the call (as well as information regarding the call).

Figure 3:
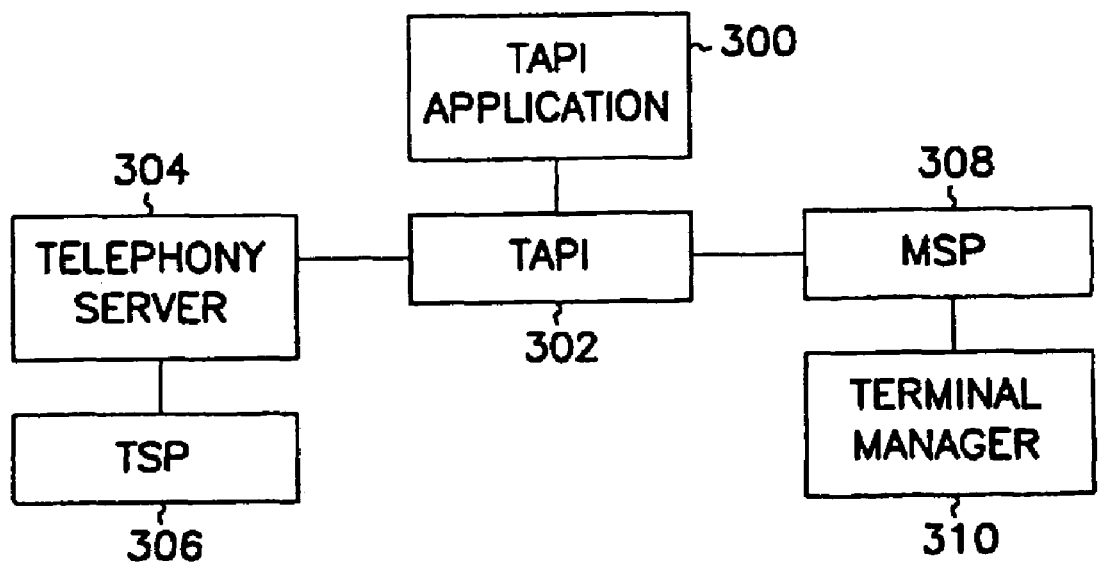
FIG. 3 shows a block diagram of an architecture according to one embodiment of the invention.

Referring next to FIG. 3, a block diagram of an architecture according to one embodiment of the invention is shown. The architecture includes a TAPI application 300, the TAPI 302, a telephony server 304, a telephony service provider 306, a media stream provider 308, and a terminal manager 310. The TAPI application 300 is a computer program that utilizes the functionality provided by the TAPI 302. That is, the TAPI application 300 is any type of computer program that utilizes the TAPI 302, through which the application is able to access telephony call control and media control functionality provided by the TAPI 302.

The telephony server 304 and the telephony service provider 306 make up the call control aspects of the architecture of FIG. 3. The telephony server 304 keeps track of all telephony capabilities on a given computerized system; for example, such as that found within versions of the MICROSOFT WINDOWS NT operating system. The telephone service provider 306 is a component used to control a specific piece of telephony hardware. Although only one provider 306 is shown in FIG. 3, the invention is not so limited; there can be many such providers installed.

The media stream provider 308 and the terminal manager 310 make up the media control aspects of the architecture of FIG. 3. The media stream provider 308 is an extension of the provider 306, and works together with the provider 306 to implement call control (via the provider 306) and media control (via the provider 308). All call control requests proceed through the telephony server 304 to the provider 306, and all media control requests proceed through to the provider 308. The media stream provider 308 is a component used to control a specific media stream (such as audio, video, etc.). Furthermore, there is a media stream provider 308 for each different media stream; although only one provider 308 is shown in FIG. 3, the invention is not so limited—there can be many such providers installed.

The terminal manager 310 is a media control manager. It is a component that instantiates a media control object for each installed multimedia device. That is, it is a component that allows telephony applications (such as application 300) to use any multimedia device installed within a telephony environment. When the manager 310 is initialized, it discovers all multimedia devices that it can use that are installed on a given computer, such as sound cards, video capture cards, as well as other multimedia hardware; the invention is not so limited. The manager than creates a media control object, such as a terminal object, for each of these devices. The manager 310 also creates terminal objects or media control objects for other media sources or sink that do not necessarily correspond to hardware, but rather to virtual devices. These types of device represent media stream processing that is performed by the computer itself, rather than specific hardware. For example, these types of terminals may include a video window, a speech recognition engine, and a file; the invention is not so limited.

The TAPI 302 in one embodiment has an interface that defines how the provider 308 communicates with the terminal manager 310. This interface allows any provider 308 (there may be more than one provider 308, although for purposes of clarity only one is shown in FIG. 3) to query the manager 310 for the devices that are represented as terminal or media control objects. The interface also allows the provider 308 to determine from the manager 310 how to include these devices within media streams that the provider 308 is to set up. Therefore, the manager 310 allows any provider 308 to access the same set of terminal or media control objects, and use them with any telephony hardware.

Exemplary Methods

In this section of the detailed description, exemplary methods according to embodiments of the invention are presented. This description is provided in reference to FIGS. 4(*a*) through 4(*b*). These exemplary methods are desirably realized at least in part as one or more programs running on a computer—that is, as a program executed from a computer-readable medium such as a memory by a processor of a computer. The programs are desirably storable on a computer-readable medium such as a floppy disk or a CD-ROM, for distribution and installation and execution on another (suitably equipped) computer.

Thus, in one embodiment, a computer program is executed by a processor of a computer from a medium therefrom, where the program may include address objects, call objects, terminal objects, and call-hub objects, as described in the previous section of the detailed description. Each of these objects may in one embodiment also correspond to a specific means for performing the functionality of the object. In another embodiment, the computer program also includes a terminal manager, which detects a plurality of multimedia devices and instantiates a terminal object for each multimedia device detected, as has also been described in the previous section of the detailed description.

Referring now to FIG. 4(*a*), a flowchart of a method for placing an outgoing computer telephony call, according to an embodiment of the invention, is shown. In 400, a TAPI object is instantiated by an application program so that the program is able to use the functionality provided by the TAPI. In 402, the TAPI object is initialized. For example, a terminal manager is run to instantiate terminal objects for physical and virtual multimedia devices, as has been described in the previous section of the detailed description.

In 404, the TAPI object is queried for an enumeration of the address objects available from the TAPI object. Each address object has certain telephony capabilities—for example, one may relate to an ISDN line, another to a PSTN line, etc. Thus, in 406, each address object is queried to learn its telephony capabilities. The desired address object or objects are then selected, depending on the type of call desired (e.g., a regular voice call may go over a PSTN line, a video call may go over one or more ISDN lines, etc.).

In 408, a call object is instantiated from a desired address object or objects. The call object thus relates to the computer performing the method of FIG. 4(*a*) as being the caller for a specific computer telephony call utilizing the desired address object or objects. In 410, the desired address object or objects are queried for an enumeration of the terminal objects available from the address object or objects. For example, an address object relating to a PSTN line over which voice calls are placed may have a terminal object relating to a microphone and a terminal object relating to a sound card connected to a speaker. Depending on the type of call desired, then, in 412 at least one desired terminal object enumerated in 410 is selected. Finally, in 414, the outgoing computer telephony call is connected (i.e., placed) over the desired address object or objects utilizing the desired terminal object or objects.

Thus, placing a computer telephony call according to the embodiment of the invention of FIG. 4(a) involves determining the address objects that are available such that a call may be placed over them, and selecting a desired address object or objects. A call object is created for the specific call to be placed. The terminal objects that are available for the utilized address objects are then determined, and the desired terminal objects are selected. The call is then placed, such that the address objects represent the communication media over which the call is placed, and the terminal objects represent the multimedia devices that act as end points for the media stream communicated over the communication media.

Referring next to FIG. 4(b), a flowchart of a method for receiving an incoming computer telephony call, according to an embodiment of the invention, is shown. In 450, a TAPI object is instantiated by an application program so that the program is able to use the functionality provided by the TAPI. In 452, the TAPI object is initialized. For example, a terminal manager is run to instantiate terminal objects for physical and virtual multimedia devices, as has been described in the previous section of the detailed description.

In 454, the TAPI object is queried for an enumeration of the address objects available from the TAPI object. Each address object has certain telephony capabilities—for example, one may relate to an ISDN line, another to a PSTN line, etc. Thus, in 456, each address object is queried to learn its telephony capabilities. The desired address object or objects are then selected, depending on the type of call that is desired to be listened for (e.g., a regular voice call may be received over a PSTN line, a video call may be received over one or more ISDN lines, etc.).

In 458, an event callback is instantiated and registered on the TAPI object. The event callback is a request by the application program performing the method of FIG. 4(b) to have the TAPI object notify the application program when the desired event occurs—in this case, when an incoming call is received. In 460, the desired address object or objects are also registered with the TAPI object. These are the address object or objects over which an incoming computer telephony call is to be listen for by the TAPI object, such that upon occurrence of such an event, the application program performing the method of FIG. 4(b) is notified. Thus, in 462, a notification of an incoming computer telephony call from the TAPI object is received on the event callback. After receiving notification, the available terminals are enumerated 464 and the desired terminals are selected 466. In 468, the incoming computer telephony call is connected (i.e., received) over the desired address object or objects.

As has been described, receiving a computer telephony call according to the embodiment of the invention of FIG. 4(b) involves determining the address objects that are available such that a call may be received over them, and selecting a desired address object or objects. An event callback is created and registered, so that notification is received when a call arrives over the desired address object or objects. The call is then received (created), such that the address objects represent the communication media over which the call is received.

Pluggable Terminals

In the past, integrating many proprietary media processing devices into a TAPI system was messy. Consider the plight of a user trying to get TAPI to work with many different types of proprietary media processing devices—each with a different interface and method of operation requiring special treatment. Also, if a user wanted to add a new media processing device defined by a third party, then the user had to either revise TAPI APIs or program a private extension into a Media Stream Provider (MSP) component.

Now in TAPI 3.1, users have greater flexibility and ease with pluggable terminals. New media processing devices defined by third parties, such as sound cards, cameras, microphones, speakers, and virtual devices, are plugged into TAPI as pluggable terminals ready to send or receive multimedia communications. Pluggable terminals hide the detailed information about how the media processing device works and provide a uniform interface to TAPI. Thus, TAPI uses each pluggable terminal for multimedia communications in the same way; no special treatment is necessary. TAPI no longer needs detailed information about how each device works and users no longer need to program private extensions into the MSP component. Pluggable terminals allow TAPI to process media generically, so users can easily plug in whatever new media processing they want to do. Furthermore, once a pluggable terminal is created and plugged in, it becomes available to all users.

One aspect of the present invention is directed to systems, methods, and data structures for pluggable terminals. Pluggable terminals are part of client and server TAPI communications systems. One software system comprises a TAPI application component for conducting at least one communications session and at least one pluggable terminal for processing media during the communications session. Another TAPI communications system comprises a processor, a storage device coupled to the processor, and at least one pluggable terminal operative on the processor to process media during a communications session. Yet another TAPI communications system comprises a processor, a storage device coupled to the processor, and a TAPI application component operative on the processor to select at least one pluggable terminal for a communications session.

There are methods for plugging in and using pluggable terminals for processing media in a communications session. One method of plugging in a pluggable terminal comprises wrapping a media processing device control method to create a pluggable terminal type and making the pluggable terminal type available to a TAPI application component. One method of using a pluggable terminal comprises plugging in the pluggable terminal, selecting a pluggable terminal from a list of available terminals, and processing media during a communications by using a method of the pluggable terminal.

There are several data structures associated with pluggable terminals. One pluggable terminal type data structure has a wrapper around a media processing device control method. One data structure for registering a pluggable terminal has a terminal class name, a unique identifier, a set of media flow directions, and a set of media types supported by the pluggable terminal. One terminal base class data structure has an interface for plugging in a pluggable terminal and another interface for a TAPI application component.

These and other features, aspects, and advantages of the present invention will become better understood with reference to the following description and appended claims.

Figure 5:
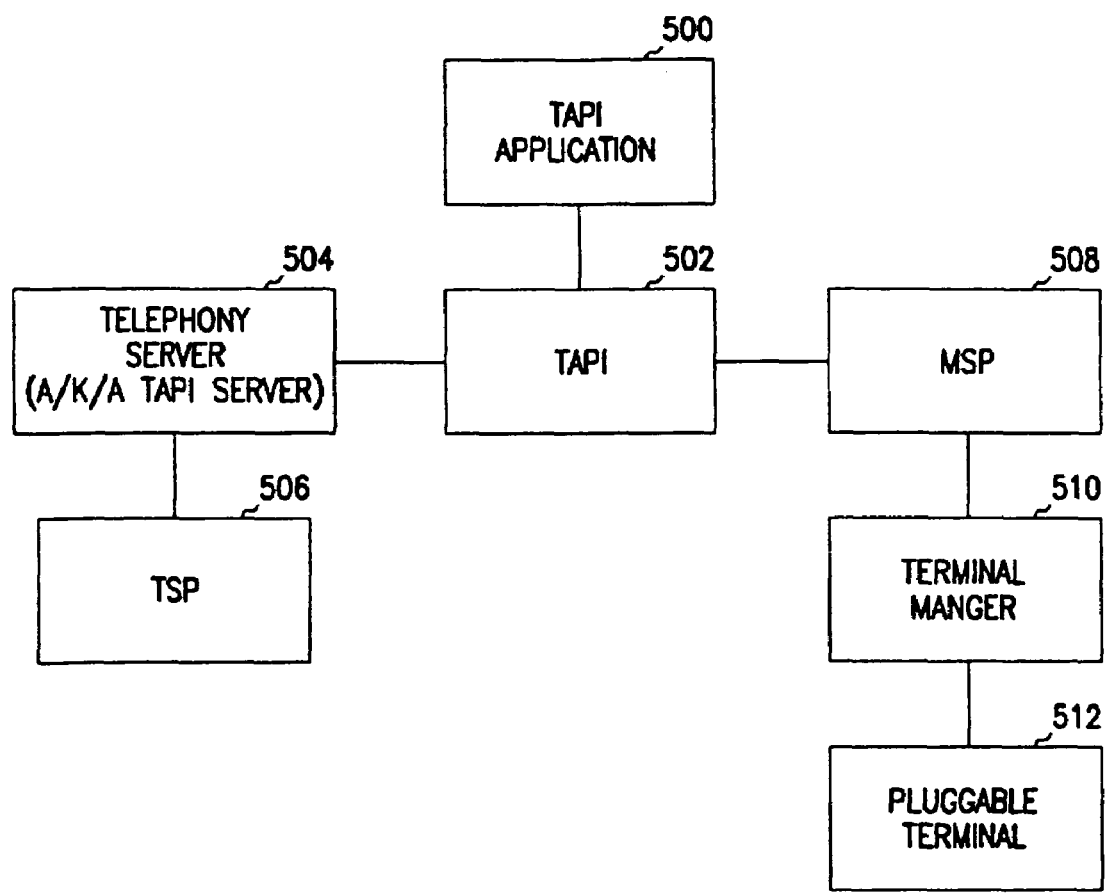
FIG. 5 is a block diagram of a system according to one aspect of the present invention.

FIG. 5 shows an embodiment of the TAPI architecture similar to FIG. 3, except for the addition of a pluggable terminal 512, which is shown in relation to the rest of the architecture. A pluggable terminal 512 is a type of terminal object that allows third parties to provide their own media processing devices and implement control methods for those devices. A terminal object represents a source or sink for media at a termination or origination point of a connection associated with a media stream. The terminal object represents a media processing device which may be a hardware device, such as a telephone or microphone; a software device, such as Internet Protocol (IP) telephony software; a virtual device, such as a window on a computer screen; or any other device capable of receiving input or creating output.

In one embodiment, the pluggable terminal 512 is plugged in and made available to a TAPI application component 500 to process media during a communications session. The TAPI application component 500 is an application program that uses the computer telephony services provided by a TAPI component 502. Some example TAPI applications are web phones, electronic banking, videoconferencing, electronic commerce, television set top boxes, web gaming, handheld computing, mobile phones, and the like. The communications session is an exchange of information over a connection among terminals, such as an IP telephony call. The communications session includes multiple simultaneous communications, such as playing music while saving it to a file.

In one embodiment, when the TAPI application component 500 initializes TAPI 502, a terminal manager component 510 creates a terminal object based on a pluggable terminal type associated with the pluggable terminal 512 and registers the pluggable terminal 512. The terminal manager component 510 discovers all available terminals, including the pluggable terminal 512, and gives a list of them to the TAPI application component 500 so that one or more may be selected for a communications session.

In one embodiment, once the pluggable terminal 512 is selected by the TAPI application component 500, the pluggable terminal 512 processes media during the communications session. A Media Stream Provider (MSP) component 508 controls the media processing and coordinates the media processing with a Telephony Service Provider (TSP) component 506. The TSP component 506 performs call control and controls communications devices. The TSP component 506 controls communications devices, such as modems, the H323 protocol for IP telephony, specialized communications protocols, and other hardware and software communications devices. A TAPI server component 504 tracks telephony resources.

Figure 6:
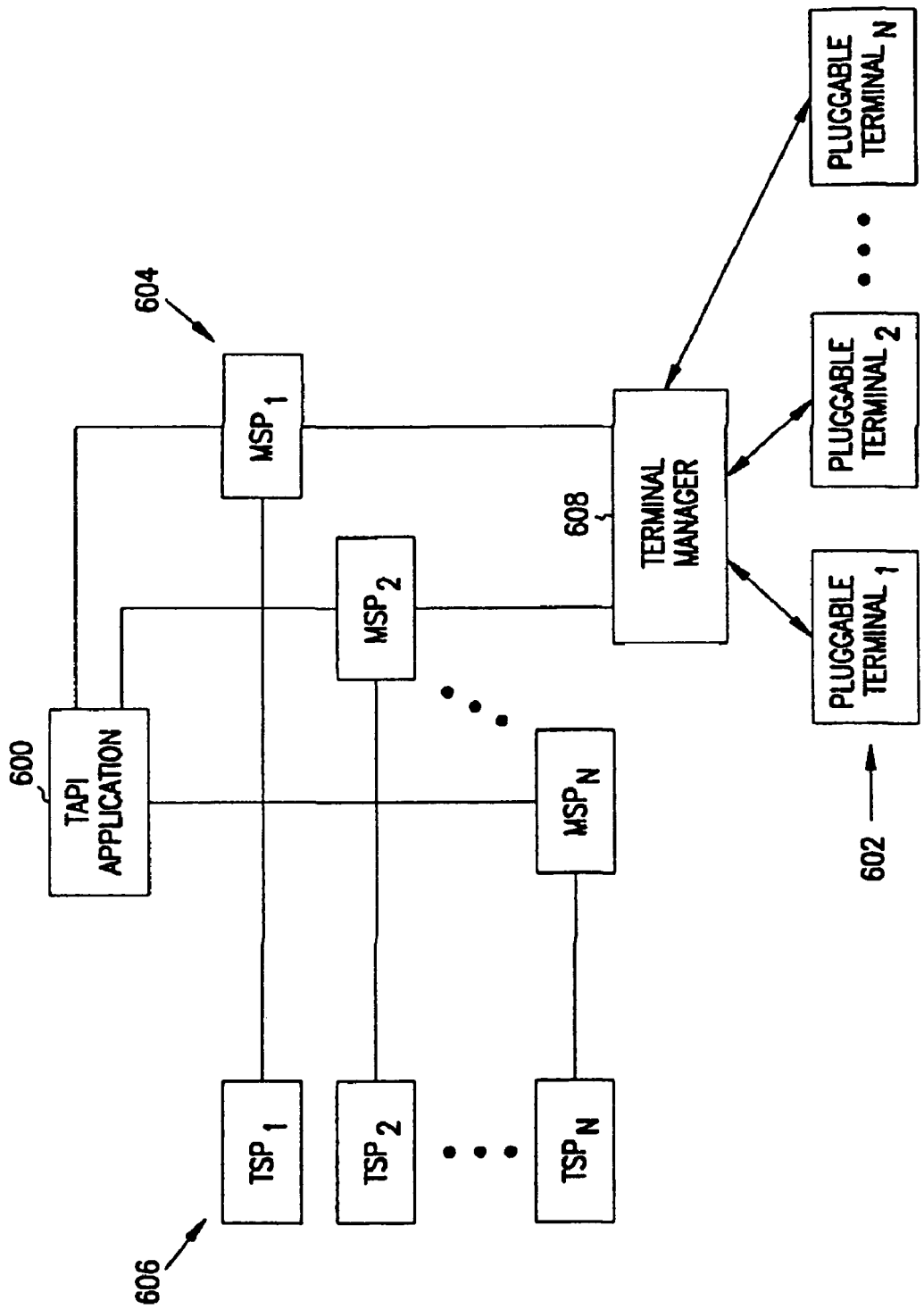
FIG. 6 is a block diagram of a system according to one aspect of the present invention.

FIG. 6 shows a system embodying the present invention. In one embodiment, the system comprises a TAPI application component 600 for conducting communications sessions and one or more pluggable terminals 602 for processing media during communications sessions. In one embodiment, the system also comprises one or more TSP components 606 and one or more MSP components 604. There is a one-to-one correspondence between TSP components 606 and MSP components 604. A MSP component 604 controls media processing in cooperation with a TSP component 606 which performs call control. In one embodiment, the system includes a terminal manager component 608. The terminal manager component 608 provides the TAPI application component 600 with a list of available terminals, including the pluggable terminals 602, through an MSP component 604. The TAPI application 600 selects a pluggable terminal 602 for a communications session and the pluggable terminal 602 processes media to or from a media processing device.

One system embodiment, such as the system in FIG. 6, comprises software components implemented as Common Object Model (COM) components, but the present invention could also be implemented as Common Object Request Broker Architecture (CORBA) components, Remote Method Invocation (RMI) between Java objects, or some other architecture enabling pieces of programs, called objects, to communicate with one another regardless of what programming language they were written in.

Figure 7:
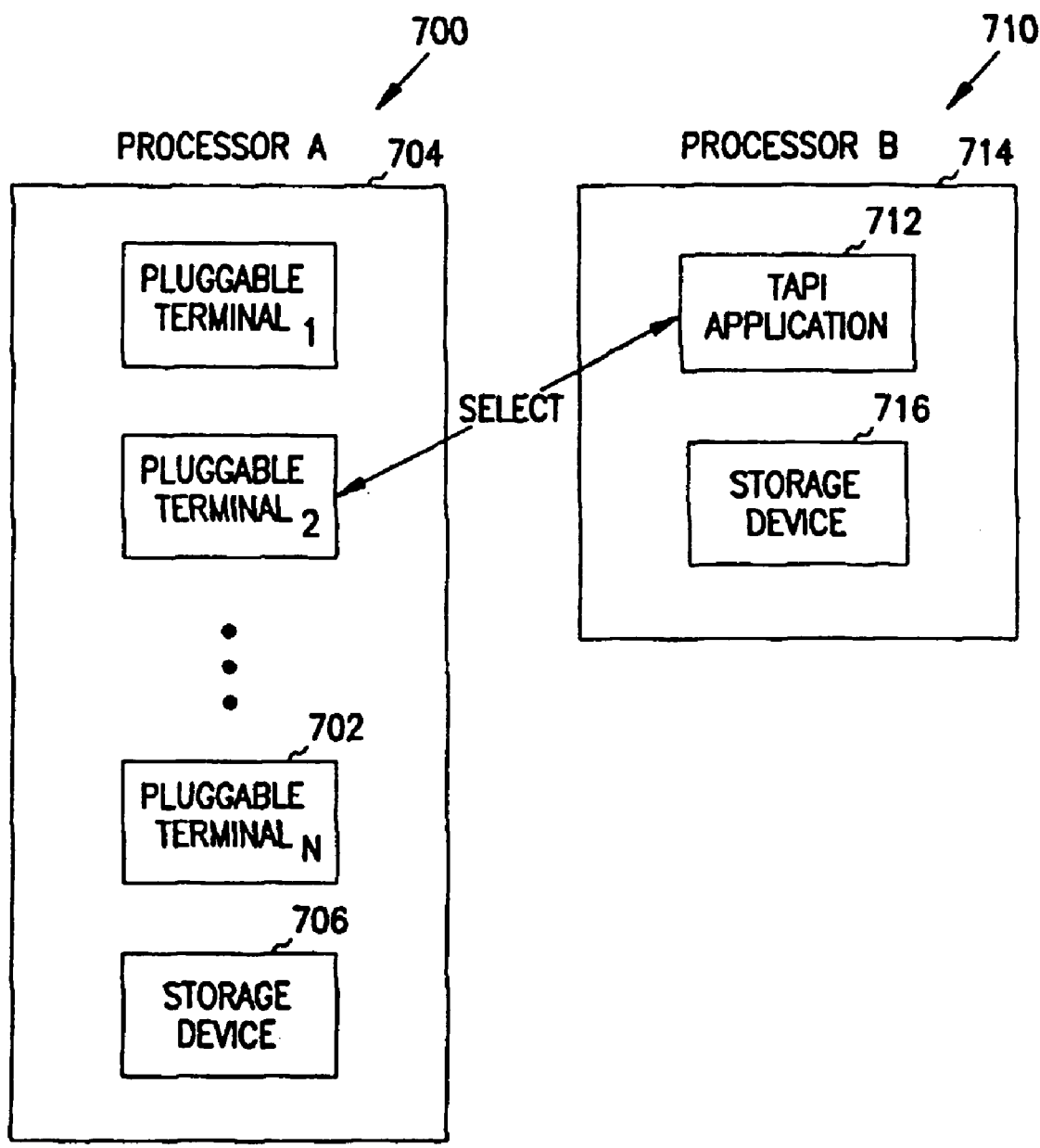
FIG. 7 is a block diagram of two systems according to one aspect of the present invention.

FIG. 7 shows two system embodiments of the present invention. In one embodiment, a TAPI communications system 700 comprises one or more pluggable terminals 702 operating on a processor 704 coupled to a storage device 706, where a selected pluggable terminal 702 processes media during a communications session. Some examples of TAPI communications systems 700 are portable devices, wearable computers, tablets, handheld devices, pocket-sized personal computers and the like. In another embodiment, a TAPI application component 712, which is located on a different processor from the pluggable terminal 702, selects a pluggable terminal 702 for a communications session. Again, the processor 714 is coupled to a storage device 716. After selecting the pluggable terminal 702, the TAPI application component 712 conducts a communications session using the pluggable terminal 702 for media processing. One example of a TAPI communications system 710 is an internet subscription service delivering a service to a subscriber.

Figure 8:
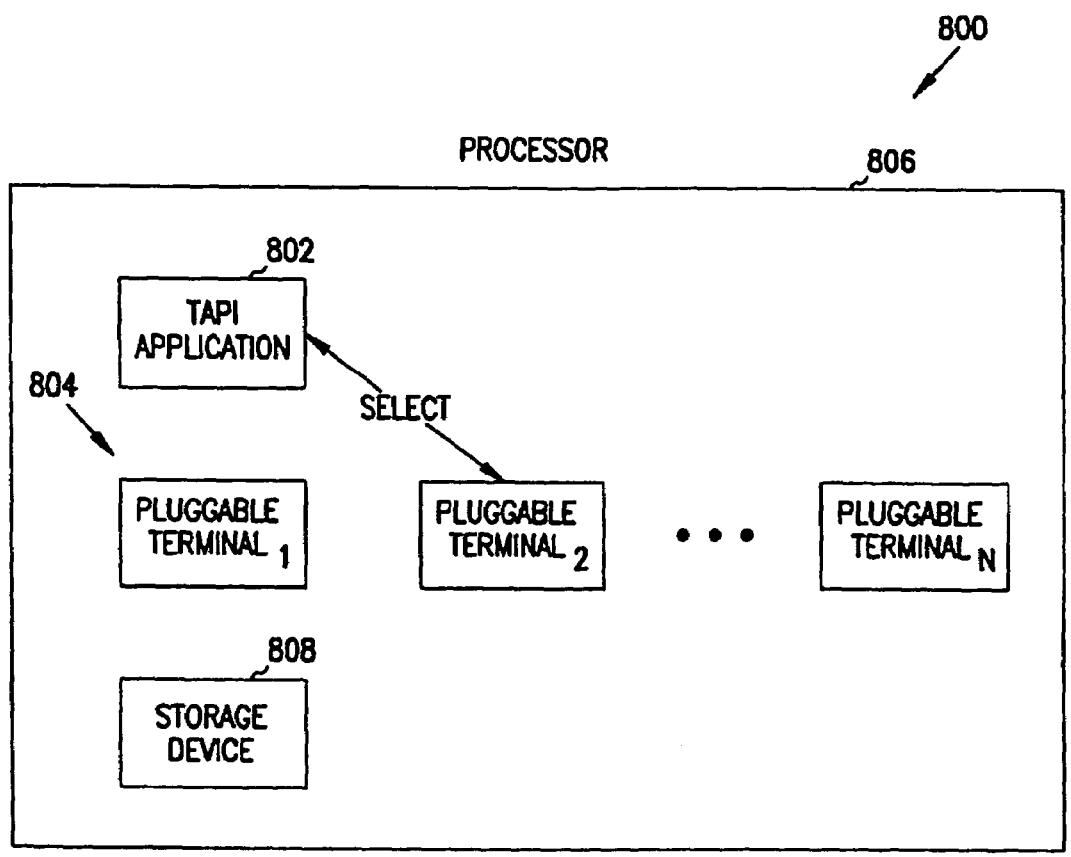
FIG. 8 is a block diagram of a system according to one aspect of the present invention.

FIG. 8 shows another system embodiment of the present invention. In this embodiment, a TAPI communications system 800 comprises a TAPI application component 802 and one or more pluggable terminals 804 all operating on the same processor 806, which is coupled to a storage device 808. In this embodiment, the TAPI application component 802 selects a pluggable terminal 804 that is located on the same processor as the TAPI application component 802 itself. One example of system 800 is playing music and recording it on the same system 800.

Figure 9:
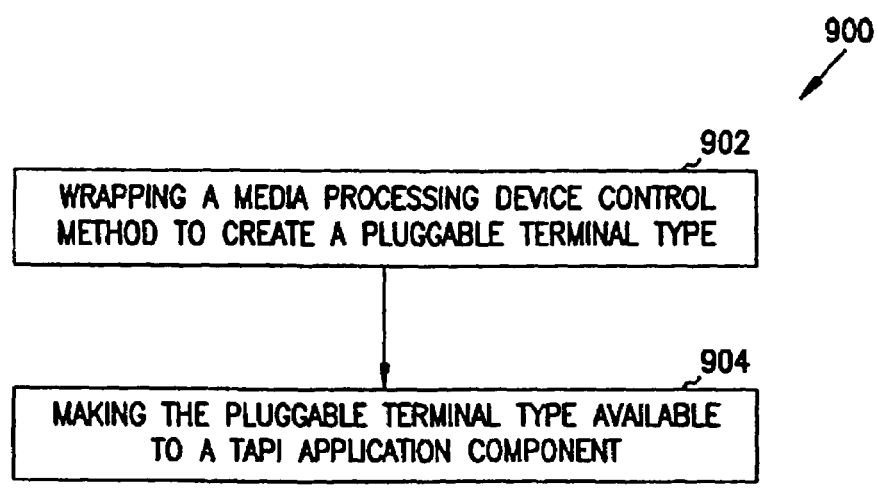
FIG. 9 is a process diagram of a method according to one aspect of the present invention.

FIG. 9 shows one method embodiment of the present invention. A method of plugging in a pluggable terminal 900 comprises wrapping a media processing device control method to create a pluggable terminal type 902 and making the pluggable terminal type available to a TAPI application component 904. Wrapping means mapping the data structures and methods of the media processing device control method onto the pluggable terminal type in a way that allows the media processing device control method to operate as a pluggable terminal. This enables interfacing software components, such as a TAPI application component, to handle each pluggable terminal object using the same methods.

Figure 10:
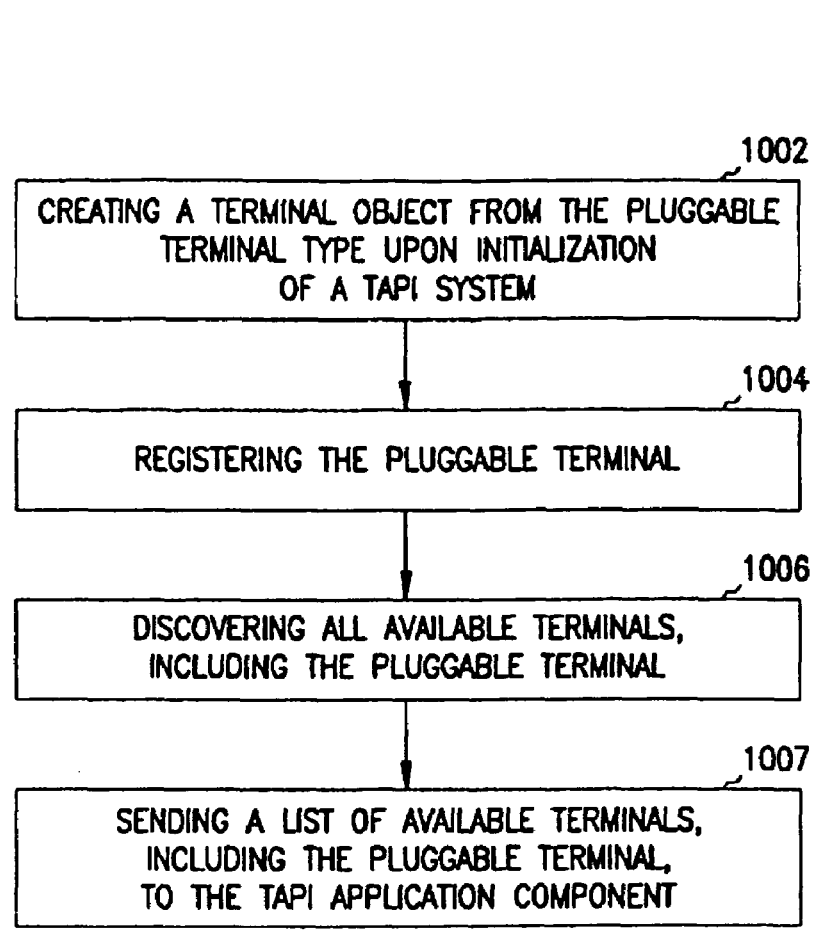
FIG. 10 is a process diagram of a method according to one aspect of the present invention.

In one embodiment, making the pluggable terminal type available to the TAPI application component 1000 comprises the following acts shown in FIG. 10: creating a terminal object from the pluggable terminal type upon initialization of a TAPI system 1002; registering the pluggable terminal 1004; discovering all available terminals, including the pluggable terminal 1006; and sending a list of available terminals, including the pluggable terminal, to the TAPI application component 1007.

Figure 11:
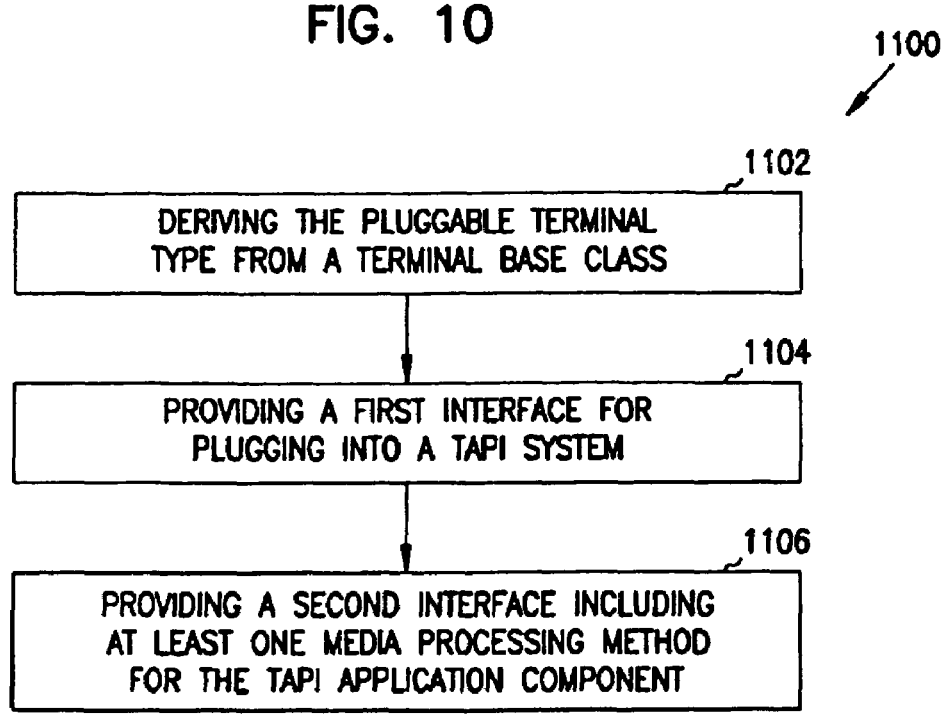
FIG. 11 is a process diagram of a method according to one aspect of the present invention.

In one embodiment, wrapping the media processing device control method 1100 comprises the following acts shown in FIG. 11: deriving the pluggable terminal type from a terminal base class 1102; providing a first interface for plugging into a TAPI system 1104; and providing a second interface including at least one media processing method for the TAPI application component 1106.

Figure 12:
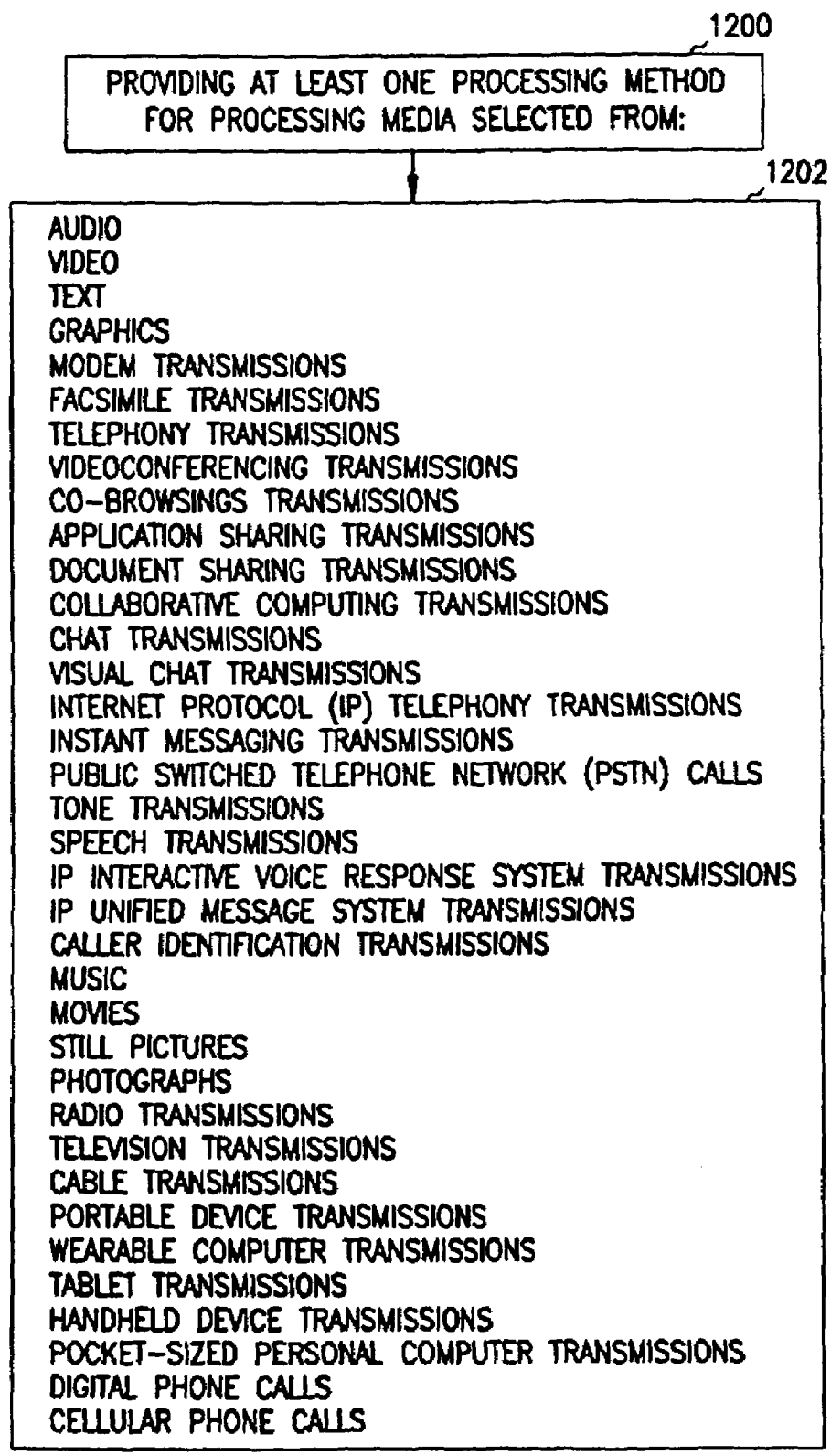
FIG. 12 is a process diagram of a method according to one aspect of the present invention.

FIG. 12 shows a list of some media types 1202 processed by the media processing methods. In one method embodiment, providing a second interface, including at least one media processing method for the TAPI application component 1106, comprises: providing at least one media processing method for processing media selected from the list of media types 1200. The media types include, but are not limited to, the following groups:
1. Audio, video, text, and graphics;
2. Modem transmissions, facsimile transmissions, and telephony transmissions;
3. Videoconferencing transmissions, co-browsing transmissions, application sharing transmissions, document sharing transmissions, and collaborative computing transmissions;
4. Chat transmissions, visual chat transmissions, IP telephony transmissions, and instant messaging transmissions;
5. PSTN calls, tone transmissions, speech transmissions, IP interactive voice response system transmissions, IP unified message system transmissions, and caller identification transmissions;
6. Music, movies, still pictures, and photographs;
7. Radio transmissions, television transmissions, and cable transmissions;
8. Portable device transmissions, wearable computer transmissions, tablet transmissions, handheld device transmissions, and pocket-sized personal computer transmissions; and
9. Digital phone calls and cellular phone calls.

The invention is not limited to a method of processing media from any one group.

Figure 13:
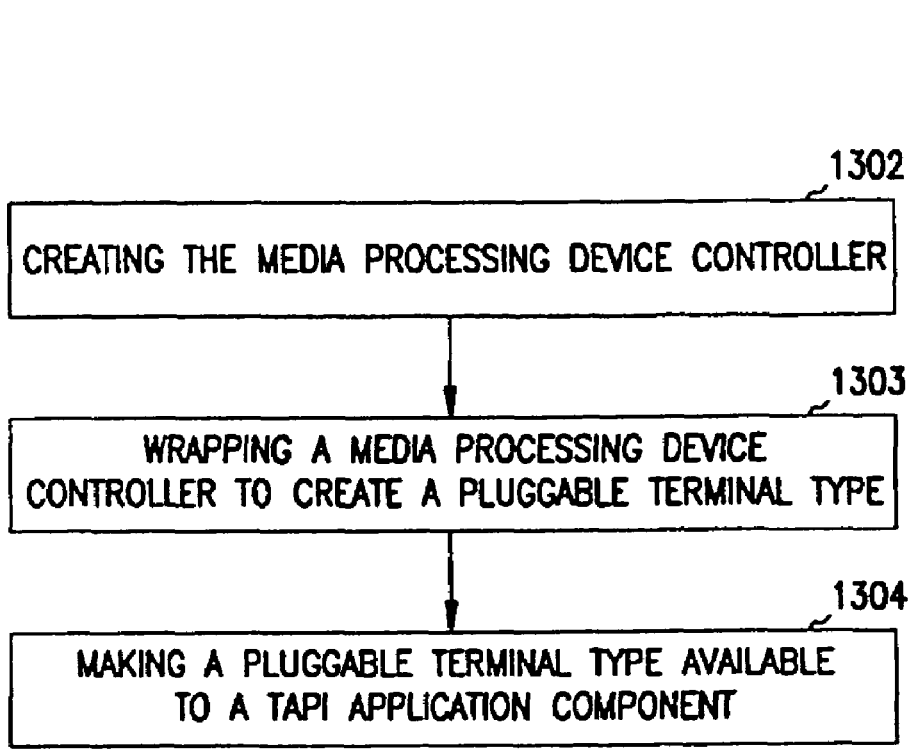
FIG. 13 is a process diagram of a method according to one aspect of the present invention.

FIG. 13 shows a method embodiment of the present invention. A method of plugging in a pluggable terminal 1300 comprises: creating the media processing device control method 1302; wrapping a media processing device control method to create a pluggable terminal type 1304; and making the pluggable terminal type available to a TAPI application component 1306. One way to create a media processing device control method is to implement a Microsoft® DirectShow® filter as a driver for the device. In an example embodiment, a hardware vendor creates methods for controlling a media processing device including media streaming methods matching the capabilities of at least one MSP component using Microsoft® DirectShow® filters. Microsoft® DirectShow® services provide playback multimedia streams from local files or Internet servers and capture of multimedia streams from devices. At the heart of the Microsoft® DirectShow® services is a modular system of pluggable components called filters, arranged in a configuration called a filter graph. A component called the filter graph manager oversees the connection of these filters and controls the stream's data flow. The invention is not limited to creating a media processing device control method using Microsoft® DirectShow® filters and other methods may be used.

Figure 14:
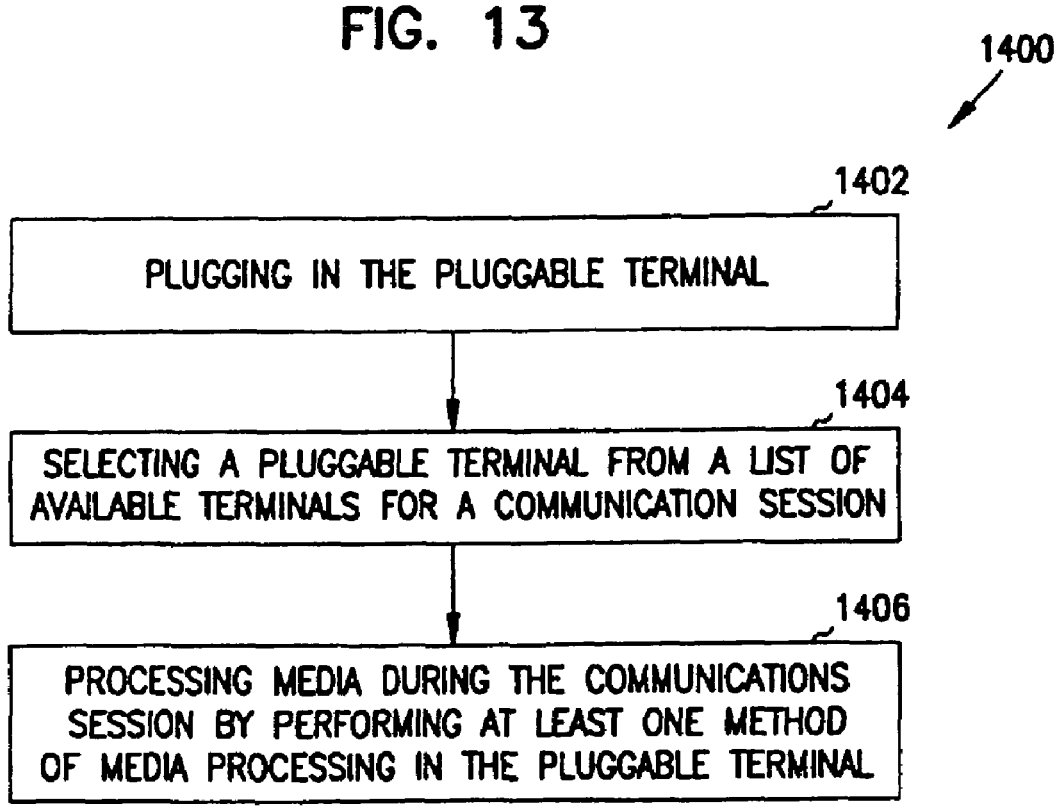
FIG. 14 is a process diagram of a method according to one aspect of the present invention.

FIG. 14 shows a method embodiment of the present invention. A method of using a pluggable terminal 1400 comprises: plugging in the pluggable terminal 1402; selecting a pluggable terminal from a list of available terminals for a communications session 1404; and processing media during the communications session by performing at least one method of media processing in the pluggable terminal 1406. In one embodiment, plugging in the pluggable terminal 1402 comprises making the pluggable terminal available to a TAPI application component.

Figure 15:
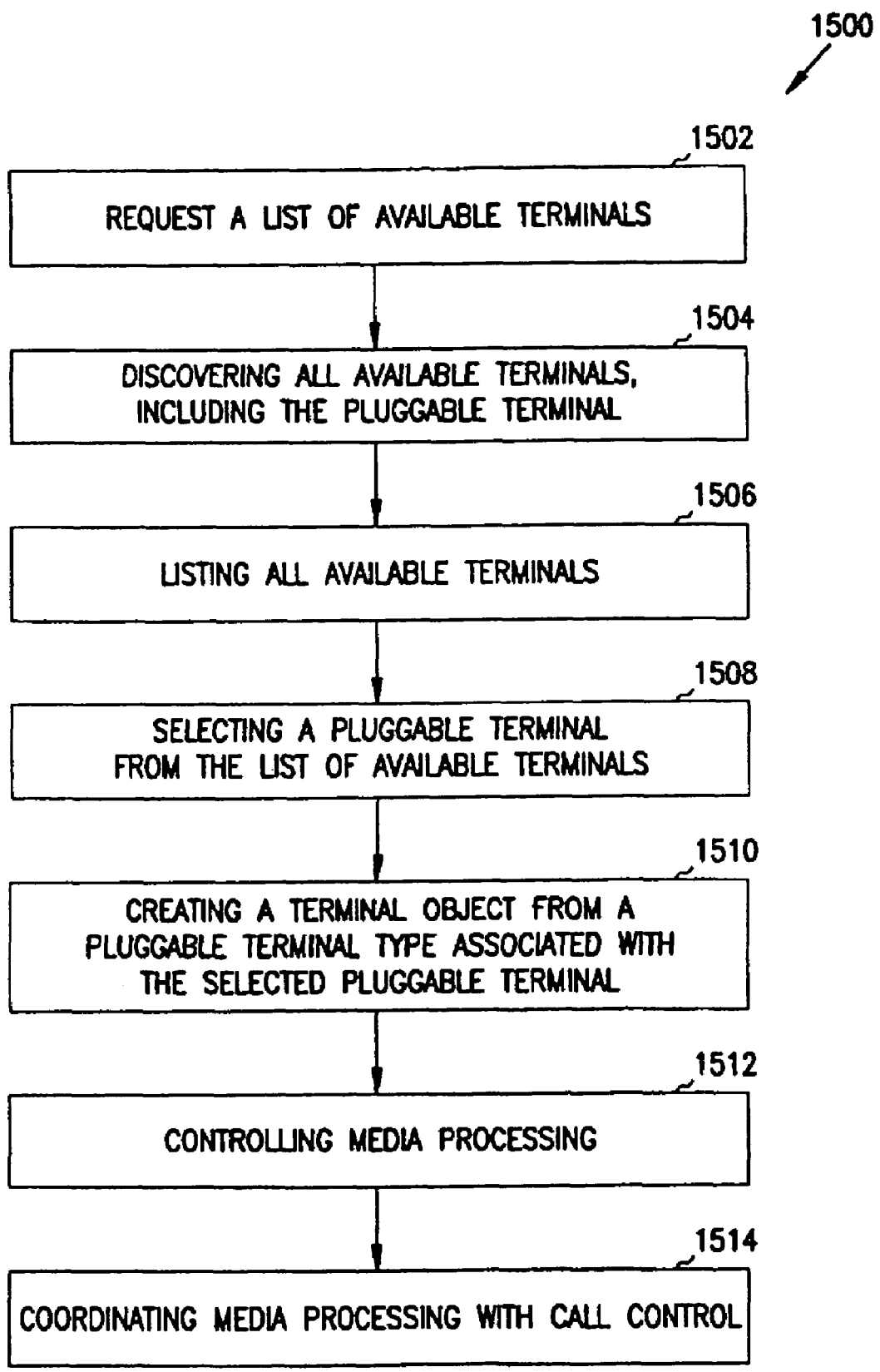
FIG. 15 is a process diagram of a method according to one aspect of the present invention.

In one method embodiment of the present invention shown in FIG. 15, selecting the pluggable terminal from the list of available terminals for a communications session 1500 comprises: requesting a list of available terminals 1502; discovering all available terminals, including the pluggable terminal 1504; listing all available terminals 1506; selecting the pluggable terminal from the list of available terminals 1508; and creating a terminal object from a pluggable terminal type associated with the selected pluggable terminal 1510. In another embodiment, the method 1500 also includes controlling media processing 1512 and coordinating media processing with call control 1514.

FIG. 16 shows a data structure embodiment of the present invention. A computer-readable medium has a data structure for registering a pluggable terminal 1600. In one embodiment, the data structure comprises a terminal class name 1602, a unique identifier 1604 for the pluggable terminal, a set of media flow directions 1606, and a set of media types 1608. The terminal class name 1602 identifies a terminal class that the pluggable terminal belongs to. For example, a terminal manager component implements a pluggable terminal as a terminal object from the pluggable terminal type or class associated with the pluggable terminal. Media flow directions indicate whether media flows to the pluggable terminal, from the pluggable terminal, or both. The set of media flow directions 1606 includes those directions supported by the pluggable terminal. The set of media types includes those media types supported by the pluggable terminal. In one embodiment, the media types supported by the pluggable terminal are selected from at least nine different groups of information 1608:
1. Audio, video, text, and graphics;
2. Modem transmissions, facsimile transmissions, and telephony transmissions;
3. Videoconferencing transmissions, co-browsing transmissions, application sharing transmissions, document sharing transmissions, and collaborative computing transmissions;
4. Chat transmissions, visual chat transmissions, IP telephony transmissions, and instant messaging transmissions;
5. PSTN calls, tone transmissions, speech transmissions, IP interactive voice response system transmissions, IP unified message system transmissions, and caller identification transmissions;
6. Music, movies, still pictures, and photographs;
7. Radio transmissions, television transmissions, and cable transmissions;
8. Portable device transmissions, wearable computer transmissions, tablet transmissions, handheld device transmissions, and pocket-sized personal computer transmissions; and
9. Digital phone calls and cellular phone calls.

The invention is not limited to selecting media types from any one group for a data structure for registering a pluggable terminal.

In another embodiment, the data structure for registering a pluggable terminal 1600 has these additional fields: a name for the pluggable terminal 1610, a company name identifying the company that made the new pluggable terminal 1612, and a version for the new pluggable terminal 1614. In another embodiment, the data structure 1600 also includes a method for registering itself 1616. In a further embodiment, the data structure 1600 also includes a method for firing events to a terminal manager component 1618. However, the method 1618 is not limited to an event mechanism and may also be a method of callbacks or any other method for signaling events among components.

Figure 17:
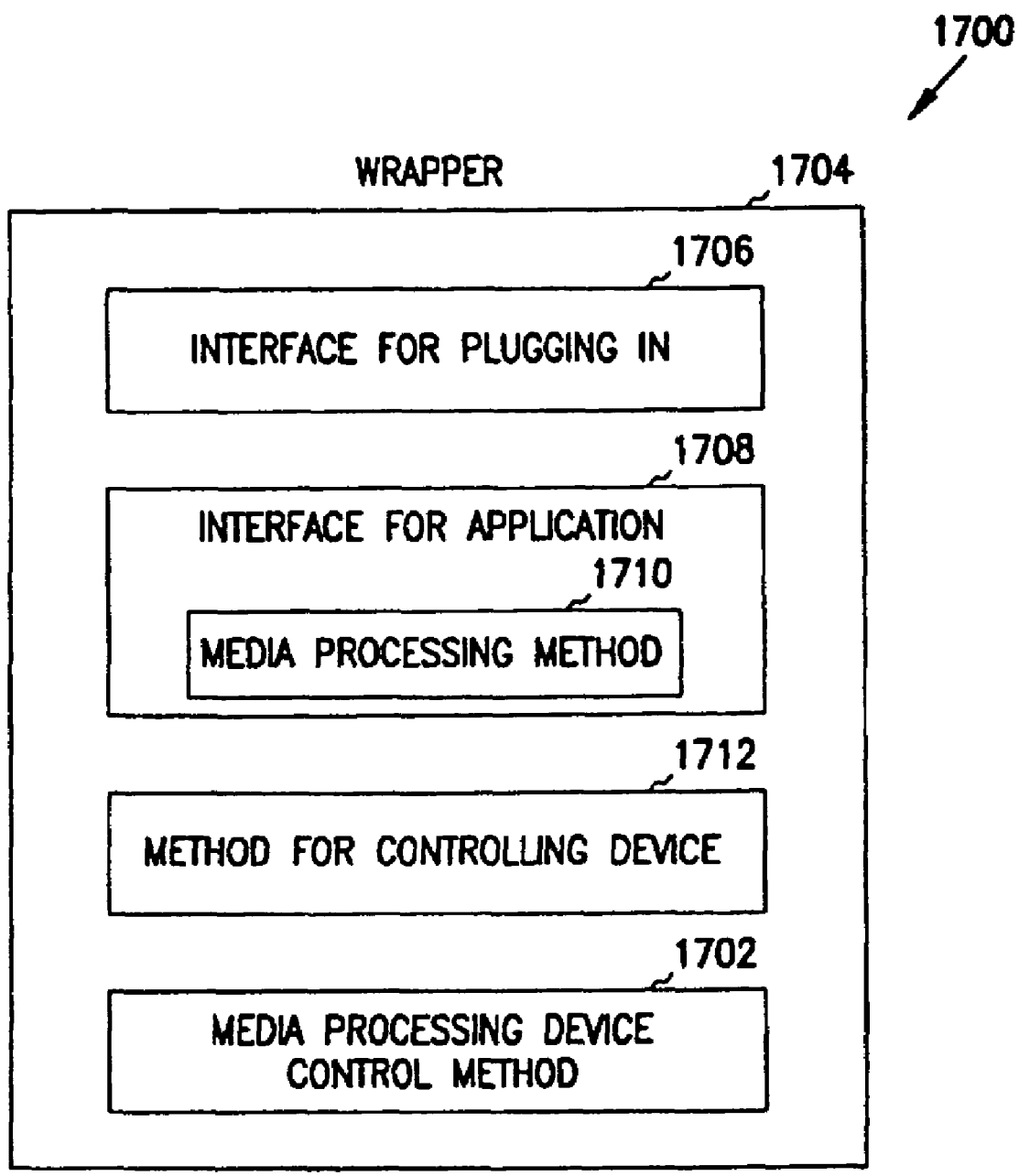
FIG. 17 is a structural diagram of a data structure according to one aspect of the present invention.

FIG. 17 shows a data structure embodiment of the present invention. A pluggable terminal type data structure 1700 comprises a media processing device control method 1702 and a wrapper around the media processing device control method 1704. In one embodiment, the wrapper comprises: a first interface for plugging in the pluggable terminal 1706; a second interface 1708 including at least one media processing method for a TAPI application component 1710; and at least one method for controlling the media processing device 1712.

Figure 18:
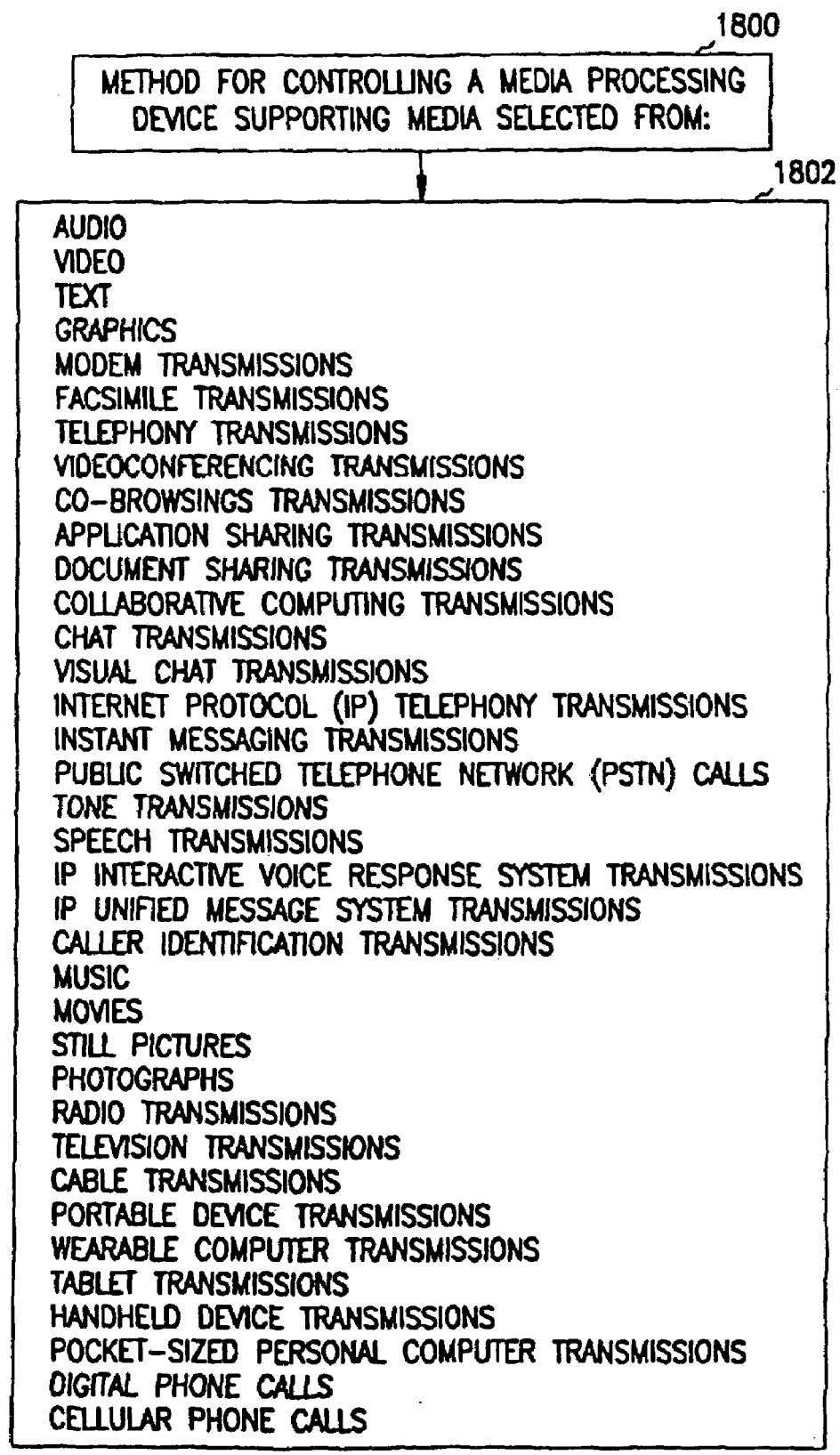
FIG. 18 is a process diagram of a method according to one aspect of the present invention.

In one embodiment shown in FIG. 18, the pluggable terminal type data structure 1700 has one or more methods for controlling a media processing device 1800, where the device supports a media type selected from one of the following groups 1802:

1. Audio, video, text, and graphics;
2. Modem transmissions, facsimile transmissions, and telephony transmissions;
3. Videoconferencing transmissions, co-browsing transmissions, application sharing transmissions, document sharing transmissions, and collaborative computing transmissions;
4. Chat transmissions, visual chat transmissions, IP telephony transmissions, and instant messaging transmissions;
5. PSTN calls, tone transmissions, speech transmissions, IP interactive voice response system transmissions, IP unified message system transmissions, and caller identification transmissions;
6. Music, movies, still pictures, and photographs;
7. Radio transmissions, television transmissions, and cable transmissions;
8. Portable device transmissions, wearable computer transmissions, tablet transmissions, handheld device transmissions, and pocket-sized personal computer transmissions; and
9. Digital phone calls and cellular phone calls.

The invention is not limited to selecting a media type from any one group.

Figure 19:
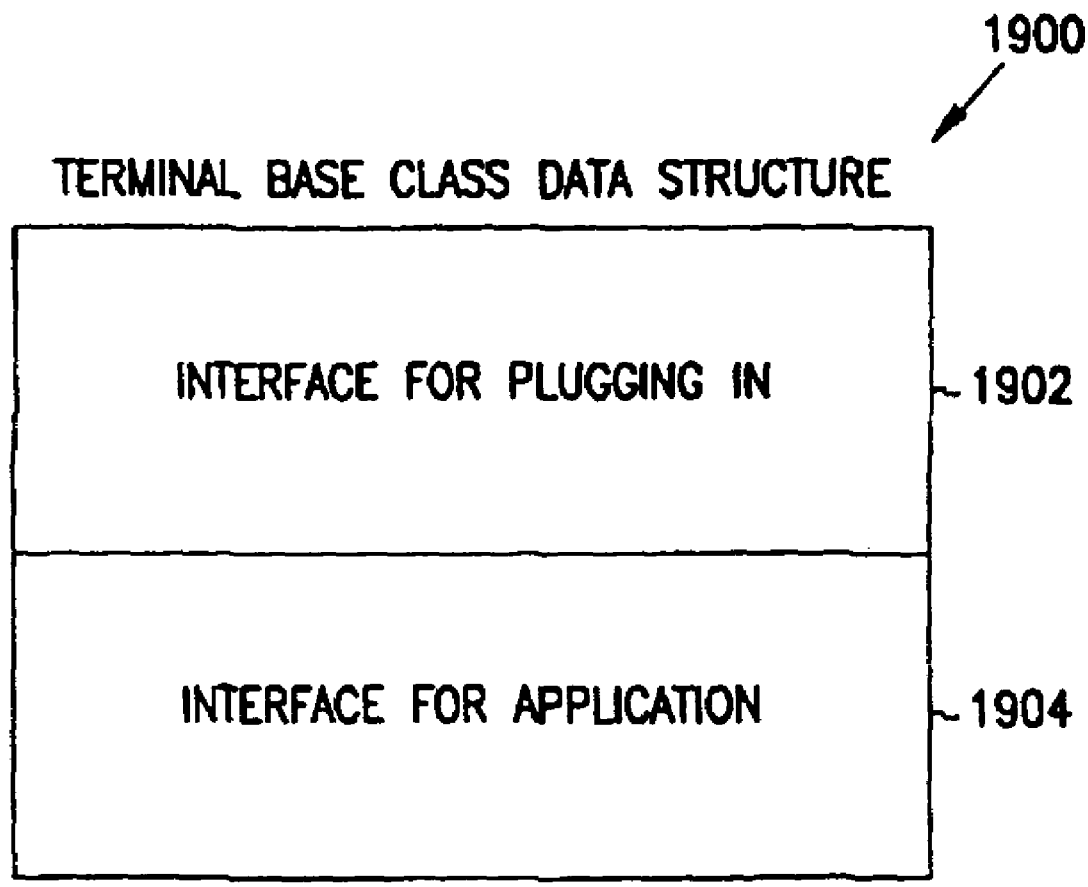
FIG. 19 is a structural diagram of a data structure according to one aspect of the present invention.

FIG. 19 shows a terminal base class data structure 1900 comprising a first interface for plugging in a pluggable terminal 1902 and a second interface for a TAPI application component 1904. In one embodiment, a pluggable terminal type is derived from a terminal base class.

The following example shows how to create a pluggable terminal for a new audio file format. In an example embodiment, a hardware vendor figures out how the audio file format fits into DirectShow®, creates filters using DirectShow®, wraps the audio file format processing methods as a pluggable terminal, and then plugs it into the TAPI system.

The following example shows how to leverage existing media processing code. In an example embodiment, a TAPI application developer, who is transitioning applications from TAPI version 2 to TAPI version 3 and, therefore, has existing code manipulating media streams directly, wraps that code in a pluggable terminal and then plugs it into the TAPI system.

The following example shows how pluggable terminals are created automatically by a TAPI system. In an example embodiment, a terminal manager component uses DirectShow® to find all multimedia devices present on a computer and then creates pluggable terminals corresponding to each multimedia device. For example, a wave device is wrapped as a pluggable terminal.

In an example embodiment, a TAPI application component selects specific pluggable terminals to use on a computer telephony call. In another example embodiment, a TAPI application component selects specific pluggable terminals to use on a call based on the media processing required for a communications session. In another example embodiment, an address object finds out which existing pluggable terminals are owned by the address object and can be used on a call, before a TAPI application program selects them. In another example embodiment, a TAPI application component creates multiple instances of a pluggable terminal and the instances are used on two computer telephony calls at the same time. Some examples of multiple instances are pluggable terminals for files, Dual Tone Multi-Frequency (DTMF) detection and generation pluggable terminals, and video window pluggable terminals. In another example embodiment, a pluggable terminal is a media streaming terminal that lets a TAPI application component read and write directly to a media stream.

CONCLUSION

Computer telephony application programming interface has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

What is claimed is:

1. A method of manipulating a telephony media stream comprising:
    selecting a media processing device to use with a media stream associated with a telephony call; and
    invoking a terminal object that provides a uniform interface to a telephony application for manipulating the media stream, wherein the terminal object maps requests to the uniform interface to requests to a device-specific interface for the selected media processing device.

2. The method of claim 1 wherein the media processing device is a virtual device.

3. The method of claim 1 wherein the media processing device is a modular media filter not specifically for telephony applications.

4. The method of claim 1 wherein the terminal object is created automatically by enumerating available devices and instantiating a terminal object for each enumerated device.

5. The method of claim 1 wherein the terminal object is a sink object.

6. The method of claim 1 including registering the terminal object and providing the terminal object in a list of available terminal objects.

7. The method of claim 1 including coordinating manipulation of the media stream with control of the call.

8. A computer-readable medium containing instructions for performing a method of manipulating a telephony media stream, the method comprising:

enumerating a list of available media processing devices;

selecting a media processing device from the list of available media processing devices to use with a media stream associated with a telephony call; and invoking a terminal object that provides a uniform interface to a telephony application for manipulating the media stream, wherein the terminal object maps requests to the uniform interface to requests to a device-specific interface for the selected media processing device.

9. The method of claim 8 wherein the media processing device is a physical device.

10. The method of claim 8 wherein the media processing device is a virtual device.

11. The method of claim 8 wherein the media processing device is a modular media filter not specifically for telephony applications.

12. The method of claim 8 wherein the media processing device is legacy application code using direct media stream manipulation.

13. The method of claim 8 wherein the terminal object signals events to the telephony application.

14. The method of claim 8 wherein the terminal object is a sink object.

15. The method of claim 8 wherein the terminal object is a source object.

16. The method of claim 8 wherein the terminal object is provided separate from the telephony application.

17. The method of claim 8 wherein the terminal object derives from a terminal base class.

18. The method of claim 8 including coordinating manipulation of the media stream with control of the call.

19. The method of claim 8 wherein the device is at least one of a microphone, speaker, camera, monitor, video window, speech recognition engine, interactive voice response system, or file.

20. A method of exposing a media processing device comprising:

providing a terminal object that provides a uniform interface to a telephony application for manipulating a media stream associated with a telephony call, wherein the terminal object maps requests to the uniform interface to requests to a device-specific interface for the media processing device; and registering the terminal object with a terminal manager which provides a list of available terminal objects.

* * * * *